(12) United States Patent
Yehia et al.

(10) Patent No.: US 7,769,982 B2
(45) Date of Patent: Aug. 3, 2010

(54) DATA PROCESSING APPARATUS AND METHOD FOR ACCELERATING EXECUTION OF SUBGRAPHS

(75) Inventors: Sami Yehia, Cambridge (GB); Krisztian Flautner, Cambridge (GB)

(73) Assignee: ARM Limited, Cambridge (GB)

( * ) Notice: Subject to any disclaimer, the term of this patent is extended or adjusted under 35 U.S.C. 154(b) by 340 days.

(21) Appl. No.: 11/884,362

(22) PCT Filed: Jun. 22, 2005

(86) PCT No.: PCT/GB2005/002453

§ 371 (c)(1),
(2), (4) Date: Aug. 15, 2007

(87) PCT Pub. No.: WO2006/136764

PCT Pub. Date: Dec. 28, 2006

(65) Prior Publication Data

US 2008/0263332 A1 Oct. 23, 2008

(51) Int. Cl.
*G06F 9/38* (2006.01)
*G06F 9/318* (2006.01)

(52) U.S. Cl. ........................................ 712/34; 712/35
(58) Field of Classification Search ................. None
See application file for complete search history.

(56) References Cited

U.S. PATENT DOCUMENTS 7,183,796 B2 * 2/2007 Leijten-Nowak ............. 326/38
7,218,139 B1 * 5/2007 Young et al. ................. 326/38
7,343,482 B2 * 3/2008 Biles et al. ................. 712/242

(Continued)

OTHER PUBLICATIONS

Clark, N., etal, Application-Specific Processing on a General Purpose Core via Transparent Instruction Set Customization, 2004, IEEE, 11 pages.*

(Continued)

*Primary Examiner*—Eric Coleman
(74) *Attorney, Agent, or Firm*—Nixon & Vanderhye P.C.

(57) ABSTRACT

A data processing apparatus and method are provided for processing data under control of a program having program instructions including sequences of individual program instructions corresponding to computational subgraphs identified within the program. Each computational subgraph has a number of input operands and produces one or more output operands. The apparatus comprises an operand store for storing the input and output operands, and processing logic for executing individual program instructions from the program. Also provided is configurable accelerator logic which, in response to reaching an execution point within the program corresponding to a sequence of individual program instructions corresponding to a computational subgraph, evaluates one or more output functions associated with the computational subgraph. The evaluation of each output function generates an output operand for storing in the operand store, and each output operand corresponds to an output that would have been generated had the sequence of individual program instructions corresponding to the computational subgraph have been executed by the processing logic. Configuration storage stores a single look-up table (LUT) configuration for each output function, and for each output function to be evaluated, the accelerator logic is configured dependent on the associated single LUT configuration from the configuration storage, such that on receipt of the input operands of the computational subgraph, the accelerator logic will generate the output operand. This technique has been found to provide a particularly efficient accelerator logic for evaluating output functions associated with computational subgraphs.

7 Claims, 10 Drawing Sheets

U.S. PATENT DOCUMENTS

2002/0083308 A1* 6/2002 De Oliveira Kastrup
Pereira et al. ............... 712/226
2003/0140222 A1* 7/2003 Ohmi et al. .................... 713/1

OTHER PUBLICATIONS

Fry, T.W. etal., The Chimaera Reconfigurable Functional Unit, IEEE Transactions on a very large integration (VLSI) systems, 2004, IEEE, pp. 206-217.*

Krishnamoorthy,S., etal., Technology Mapping Algorithms for Hybrid FPGAs Containing Lookup Tables and PLAs, IEEE Transactions on Computer-Aided Design of Integrated Circuits and Systems, 2003, IEEE, pp. 545-559.*

International Preliminary Report on Patentability in corresponding PCT Application PCT/GB2005/002453 dated Jan. 10, 2008.

International Search Report for PCT/GB2005/002453 mailed Dec. 9, 2005.

Yehia et al., "From Sequences of Dependent Instructions to *Functions*: An Approach for Improving Performance without ILP or Speculation," pp. 238-249 (2004).

Cadambi et al., "CPR: A Configuration Profiling Tool," pp. 104-113 (1999).

Clark et al., "Processor Acceleration Through Automated Instruction Set Customization," pp. 129-140 (2003).

Phillips et al, "High-Performance 3-1 Interlock Collapsing ALU's" IEEE Transactions on Computers, vol. 43, No. 3, Mar. 1994, pp. 257-268.

N. Clark et al, "Application-Specific Processing on a General-Purpose Core via Transparent Instruction Set Customization" International Symposium on Microachitecture (Micro-37), 2004.

R. Brent et al, "A Regular Layout for Parallel Adders" IEEE Trans. on Computers, C-31, Mar. 1982).

Kogge et al, "A Parallel Algorithm for the Efficient Solution of a General Class of Recurrence Equations" IEEE Transactions on Computers, vol. C-22, No. 8, Aug. 1973, pp. 786-793.

* cited by examiner

DATA PROCESSING APPARATUS AND METHOD FOR ACCELERATING EXECUTION OF SUBGRAPHS

This application is the U.S. national phase of International Application No. PCT/GB2005/002453 filed 22 Jun. 2005, which designated the U.S. The entire contents of that application is hereby incorporated by reference.

FIELD OF THE INVENTION

This invention relates to the field of data processing systems. More particularly, this invention relates to data processing systems including an accelerator capable of accelerated execution of some subgraphs within a program.

BACKGROUND OF THE INVENTION

It is known to provide data processing systems with accelerator hardware operating to accelerate execution of some program subgraphs within a program. As an example, it may be that a program has a particular need to perform a complex operation a large number of times during its normal operation, such as decrypt a large quantity of data from a stream of data using a decryption technique which repeatedly executes the same piece of program code. It is possible that this program code may be written as a sequence of individual program instructions that are sequentially separately executed by a general purpose execution unit. However, it is known to provide special purpose accelerator hardware in such circumstances that can operate to provide hardware support for accelerated execution of such specific processing requirements.

One approach is to add such special purpose accelerated hardware and then add specific instructions to the instruction set of the apparatus to represent the complex operation which is to be performed by the accelerator hardware. As an example, a general purpose instruction set could be augmented by the addition of specific decryption instructions which when encountered would be executed by the decryption acceleration hardware. This approach suffers from a number of disadvantages.

A program written to include the new decryption program instructions in place of the previous sequence of standard program instructions is no longer capable of being executed on a system which does not include the accelerator hardware. Thus, several versions of a computer program may need to be written, tested and maintained, each targeted at different hardware platforms which may or may not contain the hardware accelerator. Furthermore, different versions of a hardware accelerator may be present in different implementations with varying capabilities requiring different programs to be written to reflect those differing capabilities. The special purpose accelerator added to implement the new special purpose instructions also represents a significant design investment and requires the testing and validation for each variant that was produced.

It is also known to provide data processing systems with the capability to examine the stream of program instructions that are being executed to determine if they can be modified/re-ordered or otherwise changed to run in a more efficient fashion. An example is a system which can combine two individual program instructions to form a single fused instruction that results in the same overall processing operation but is able to execute more rapidly. Whilst such systems are effective, the hardware and complexity overhead associated with seeking to identify program instructions that can be safely fused in this way is considerable and a disadvantage.

The article by J. Phillips and S. Vassiliadis, entitled "High-performance 3-1 interlock collapsing ALUs", IEEE Transactions on computers, 43(3) March 1994, proposes a techniques which employs a 3-input ALU that can collapse up to three dependent instructions, a dependent instruction being an instruction which has an input operand which is dependent on the results of a preceding instruction. However, this approach has a number of drawbacks, in that only a limited number of dependent instructions can be managed, and the specialised ALU device only allows a specific number of patterns to be catered for.

The article by N. Clark, M. Kudlur, H. Park, S. Mahlke, K. Flautner entitled "Application-Specific Processing on a General-Purpose Core via Transparent Instruction Set Customization", International Symposium on Microarchitecture (Micro-37)—2004, describes a transparent instruction set customisation technique, in which a subgraph accelerator is used alongside a general purpose processor. Thus, a fixed processor design is maintained and the instructions set is unaltered. In accordance with this technique, subgraphs are identified and control is generated on-the-fly to map and execute data flow subgraphs on the accelerator. This avoids the need to explicitly change the instruction set. Subgraphs in the program can be discovered offline using a compiler, through binary translation, or online using a more heavy-weight dynamic optimiser. The technique proposed in this article allows the mapping of larger data flow subgraphs onto the accelerator, referred to in that article as a Custom Compute Accelerator (CCA). The CCA consists of an array of functional units of predefined patterns. However, the CCA is limited to a maximum number of dependent instructions according to the predefined shape of the CCA and the interconnection network. The CCA must either be sufficiently large to cover all desired subgraphs of the application, or can alternatively be made smaller but for specialised applications.

In the article by S. Yehia and O. Temam, entitled "From sequences of Dependent Instructions to Functions: An approach for Improving Performance without ILP or Speculation", $31^{st}$ International Symposium on Computer Architecture, 2004, a technique is proposed for collapsing sequences of dependent instructions on a bit-level configurable device associated with a ripple carry generation network. The technique described is based on configurable look-up tables (LUTs) but the approach proposed in the above article suffers from two major drawbacks. First, the proposed device is similar to a Field Programmable Gate Array (FPGA) because of its fine grain configurability at the bit level. Due to the complex hardware and interconnection network, this bit level approach makes the device too slow. Furthermore, because each bit of the output requires a configuration, the device requires very large configuration which is inefficient. Secondly, the technique proposed for generating the configuration of every output bit requires substantial hardware or software resources and must be done offline with respect to execution.

Given the above, it would be desirable to provide an improved technique for transparent instruction set customisation, which allows the accelerator to execute larger chains of dependent instructions, and which allows a more efficient and straightforward technique for generating configurations for the accelerator.

SUMMARY OF THE INVENTION

Viewed from a first aspect, the present invention provides an apparatus for processing data under control of a program having program instructions including sequences of individual program instructions corresponding to computational subgraphs identified within said program, each computational subgraph having a number of input operands and producing one or more output operands, said apparatus comprising: an operand store operable to store the input and output operands; processing logic operable to execute individual program instructions from said program; configurable accelerator logic operable, in response to reaching an execution point within said program corresponding to a sequence of individual program instructions corresponding to a computational subgraph, to evaluate one or more output functions associated with said computational subgraph, the evaluation of each output function generating an output operand for storing in the operand store, and each output operand corresponding to an output that would have been generated had the sequence of individual program instructions corresponding to the computational subgraph have been executed by the processing logic; configuration storage operable to store a single look-up table (LUT) configuration for each output function; for each output function to be evaluated, the accelerator logic being configured dependent on the associated single LUT configuration from the configuration storage such that on receipt of the input operands of the computational subgraph, the accelerator logic will generate the output operand.

In accordance with the present invention, configurable accelerator logic is used to evaluate one or more output functions associated with a computational subgraph, thereby avoiding the need for the individual program instructions corresponding to that computational subgraph to be executed by the processing logic. The processing logic will typically be a general purpose Arithmetic Logic Unit (ALU). Further, in accordance with the invention, configuration storage is provided for storing a single LUT configuration for each output function. Then, when the accelerator logic needs to evaluate an output function, it is configured dependent on the associated single LUT configuration from the configuration storage such that on receipt of the input operands of the computational subgraph, the accelerator logic will generate the output operand.

In accordance with the present invention, a single LUT configuration is provided for each output function, which significantly simplifies the number of control signals required to configure the accelerator logic, resulting in a fast and efficient configuration of the accelerator logic. The use of a single LUT configuration for each output function should be contrasted with the approach suggested in the earlier-mentioned S. Yehia and O. Temam article entitled "From sequences of Dependent Instructions to Functions: An approach for Improving Performance without ILP or Speculation", which required a LUT configuration to be derived for each single bit of the output operand. This was due to the fact that the computation of the output for each bit required the carries from lower significant bits, resulting in the need to generate a separate LUT configuration for each output bit. Whilst this provided a great level of flexibility with regards to the operations that could be catered for, it was very costly in terms of performance and area. Further, the ripple carry scheme imposed by the programming of every single bit was unduly slow.

These problems with the prior art are obviated through use of the present invention, whereby each output function has a single LUT configuration associated therewith, with the same LUT configuration being used to generate each bit of the output operand, thereby resulting in a simple configuration and fast and efficient execution of computational subgraphs by the accelerator logic.

The apparatus of embodiments of the present invention can be used to handle computational subgraphs corresponding to many different sequences of individual program instructions. However, in one embodiment, the sequence of individual program instructions corresponding to the computational subgraph consist of logical instructions requiring only bitwise level operations on the input operands of the instructions, and for each output function, the associated single LUT configuration consists of $2^n$ bits, where n is less than or equal to the number of input operands of the computational subgraph.

It has been found that there are a significant number of computational subgraphs where the corresponding sequence of individual program instructions are all logical instructions requiring only bitwise level operations on the input operands. Examples of such instructions are AND, OR, XOR, NOT, NAND, and NOR instructions, etc. Because the operations required are only bitwise level operations, there are no issues of a carry being generated that needs to be propagated from low order bits to higher order bits, and accordingly this significantly reduces the complexity in defining the required LUT configuration for the output function. In one particular embodiment, the associated single LUT configuration consists of $2^n$ bits, where n is equal to the number of input operands of the computational subgraph. In such embodiments, the accelerator logic can be considered to comprise a multiplexer which receives as an input the single LUT configuration associated with the output function to be evaluated, and which receives an input control signal based on particular bits of all of the input operands of the computational subgraph. Such a multiplexer would be provided for each output bit, but it should be noted that each multiplexer will receive the same LUT configuration as input.

The above described embodiment enables any number of logical instructions to be provided within the computational subgraph, and the accelerator logic provides a route whereby those logical instructions can be collapsed for execution within the accelerator logic rather than the processing logic, with a single LUT configuration being provided for each output function of the subgraph to be evaluated.

In addition to being able to support subgraphs containing any number of logical instructions, it would also be desirable to provide some functionality for handling subgraphs that include arithmetic instructions requiring carry propagations. In accordance with one embodiment: the sequence of individual program instructions corresponding to the computational subgraph further comprise one or more arithmetic instructions requiring carry propagation operations; the configuration storage comprises, for each arithmetic instruction, a set of carry determination LUT configurations; the accelerator logic comprises, for each arithmetic instruction, carry generation logic configured by the associated set of carry determination LUT configurations to generate a carry operand from the input operands of the computational subgraph; for each output function, the single LUT configuration consists of $2^{n+m}$ bits, where m is the number of arithmetic instructions within the sequence of individual program instructions corresponding to the computational subgraph.

Hence, in accordance with such embodiments, for each arithmetic instruction provided within a computational subgraph, the configuration storage stores a set of carry determination LUT configurations, and the accelerator logic comprises for each such arithmetic instruction carry generation logic which is configured by the associated set of carry determination LUT configurations. The purpose of the carry generation logic is to generate a carry operand from the input operands of the computational subgraph. Hence, for each arithmetic instruction, a single carry operand is generated by the associated carry generation logic. Then, for each output function, the single LUT configuration consists of $2^{n+m}$ bits, where m is the number of arithmetic instructions within the computational subgraph. Hence, by this approach, a predetermined number of arithmetic instructions can be allowed within any computational subgraph through the provision of a corresponding predetermined number of carry generation logic units within the accelerator logic. The single LUT configuration for each output function increases in size in dependence on the number of arithmetic instructions supported, but it is still the case that for each output function, a single LUT configuration is required. In such embodiments, the accelerator logic can be considered to comprise an output multiplexer which receives as its input the single LUT configuration, but which is controlled not only by the input operands of the computational subgraph but also by each of the carry operands generated by the respective carry generation logic unit(s) in the accelerator logic.

It will be appreciated that the more arithmetic instructions supported, the larger the accelerator logic becomes, since there is a need to provide carry generation logic for each such arithmetic instruction, and further the size of the single LUT configuration for each output function, and accordingly the size of the multiplexer used to produce the output operand within the accelerator logic, increases dependent on the number of arithmetic instructions, and accordingly the number of carry operands produced. Accordingly, for any particular implementation, a balance needs to be struck between the number of arithmetic instructions supported, and the size and complexity of the corresponding accelerator logic. In one particular embodiment, the accelerator logic provides two carry generation logic units, such that the accelerator logic can execute subgraphs containing any number of logical operations, and up to two arithmetic instructions. The arithmetic instructions can take a variety of forms, but in one example the arithmetic instructions are addition and subtraction instructions. It has been found that such embodiments can provide significant efficiency savings over the known prior art techniques, by providing a configurable accelerator which is efficiently configured, and which enables the output operands associated with computational subgraphs to be generated significantly more quickly than would be the case if the individual program instructions corresponding to the computational subgraph were instead routed through the general purpose ALU.

It will be appreciated that the set of carry determination LUT configurations provided for each arithmetic instruction can take a variety of forms, and typically will depend on the method employed to generate the carry operands. It is possible, for example, that each set of carry determination LUT configurations may comprise a single carry determination LUT configuration. However, in one embodiment, each set of carry determination LUT configurations comprises a generate LUT configuration and a propagate LUT configuration, the generate LUT configuration defining a logical AND operation performed using at least two portions of the subgraph as inputs and the propagate LUT configuration defining a logical XOR operation performed using at least two portions of the subgraph as inputs. The portions of the subgraph used as inputs will depend on the position of the associated arithmetic instruction within the sequence of individual program instructions corresponding to the computational subgraph. In some cases, one of the portions may in fact directly provide as an input to the AND and XOR operations one of the input operands of the computational subgraph, in situations where the arithmetic instruction directly receives as one of its inputs such an input operand. However, in other embodiments, the inputs for the arithmetic instruction may both be outputs from previous instructions in the computational subgraph, in which case the portions of the subgraph used as inputs will be those portions containing the instructions in question.

In one embodiment, where the one or more arithmetic instructions comprise add or subtract instructions, each carry generation logic within the accelerator logic is further configured by a control bit identifying whether the associated arithmetic instruction is an add instruction or a subtract instruction. This enables the same hardware within the accelerator logic to be used to generate the carry operands for both add instructions and subtract instructions.

The single LUT configuration provided for each output function within the configuration storage may be generated in a variety of ways. For example, it is possible that a compiler may be used to generate the required LUT configurations prior to execution of the program. Alternatively, a user may directly provide functions in the program to be used as the required LUT configurations. However, in one embodiment, the apparatus further comprises meta processor logic operable to generate the single look-up table (LUT) configuration for each output function, the meta processor logic being operable to generate, for each instruction in the sequence of individual program instructions corresponding to the computational subgraph, a LUT configuration representing the instruction output function.

Hence, the meta processor analyses each instruction in the sequence of instructions corresponding to the computational subgraph and generates LUT configurations for each instruction. Assuming, by way of example, that the sequence of instructions corresponding to the computational subgraph includes a sequence of dependent instructions, it will be appreciated that when analysing a current instruction that is dependent on a preceding instruction, the LUT configuration generated for the preceding instruction can be used in evaluating the relevant LUT configuration to be associated with the current instruction, such that by working through each instruction in turn, the meta processor can generate a separate LUT configuration for each output function associated with the computational subgraph. It will be appreciated that, depending on the instructions included within the computational subgraph, the computational subgraph may only specify one output function, or in alternative embodiments may specify more than one output function.

The meta processor logic can be arranged in a variety of ways. However, in one embodiment the meta processor logic is operable, for each instruction in the sequence of individual program instructions corresponding to the computational subgraph, to: (a) examine the input operands of that instruction to determine if any input operand corresponds to an output operand of an instruction already processed by the meta processor logic; (b) associate with each input operand that does not correspond to an output operand of an instruction already processed by the meta processor logic one of a plurality of predetermined LUT configurations; (c) associate with each input operand that does correspond to an output operand of an instruction already processed by the meta processor logic the LUT configuration representing the associated instruction output function; and (d) perform a logical operation dependent on the operation specified by the instruction using as inputs the LUT configurations associated with each input operand in order to generate a LUT configuration representing the instruction output function for that instruction. It has been found that such an approach provides a very efficient method for generating the required LUT configurations for the accelerator logic. In one embodiment, each predetermined LUT configuration used at step (b) above is a corresponding column of a conceptual truth table, and can be considered to provide an identity function to represent the input operand.

In one particular embodiment: each instruction may specify one or more registers, each register being specified as either an input register for an input operand of that instruction or an output register for an output operand of that instruction; the meta processor logic comprises a meta register file having at least a meta register for each output register specified by the sequence of individual program instructions corresponding to the computational subgraph, each meta register being used to identify the LUT configuration associated with the associated output operand; and the meta processor logic further comprising a meta logic unit operable to perform, with reference to appropriate meta registers of the meta register file, the logical operation dependent on the operation specified by each instruction.

Hence it can be seen that the meta logic unit and associated meta register file act conceptually like an arithmetic logic unit and associated register file within a processor core, but instead of actually evaluating output operands from the associated input operands, the meta logic unit and associated meta register file are used to determine output functions that can be used to generated output operands based on input functions associated with the input operands.

In one embodiment, the meta register file has a meta register for each register specified by the sequence of individual program instructions, and each LUT configuration generated by the meta processor logic to represent an instruction output function is stored directly in the relevant meta register of the register file, and the plurality of predetermined LUT configurations are identified in the relevant meta registers by pointers to those predetermined LUT configurations. In embodiments where meta registers are provided for both input and output registers, the use of pointers for the plurality of predetermined LUT configurations provides a more efficient implementation of the meta register file by avoiding the need to replicate any of the predetermined LUT configurations directly within the meta register file.

In one embodiment, in addition to generating the single LUT configurations used for each output function, the meta processor logic is further operable to generate, for each arithmetic instruction, the set of carry determination LUT configurations used when the instructions corresponding to the computational subgraph include arithmetic instructions. Hence, in such embodiments, the meta processor logic can be used to generate all of the LUT configurations needed to be stored in the configuration storage for access by the accelerator logic. In one embodiment the meta register file contains additional registers operable to store each set of carry determination LUT configurations.

Viewed from a second aspect, the present invention provides a method of processing data under control of a program having program instructions including sequences of individual program instructions corresponding to computational subgraphs identified within said program, each computational subgraph having a number of input operands and producing one or more output operands, said method comprising the steps of: executing individual program instructions from said program with processing logic; in response to reaching an execution point within said program corresponding to a sequence of individual program instructions corresponding to a computational subgraph, evaluating within configurable accelerator logic one or more output functions associated with said computational subgraph, the evaluation of each output function generating an output operand, and each output operand corresponding to an output that would have been generated had the sequence of individual program instructions corresponding to the computational subgraph have been executed by the processing logic; storing a single look-up table (LUT) configuration for each output function; for each output function to be evaluated, configuring the accelerator logic dependent on the associated single LUT configuration such that on receipt of the input operands of the computational subgraph, the accelerator logic will generate the output operand.

Viewed from a third aspect, the present invention provides a computer program on a carrier medium comprising a program having program instructions including sequences of individual program instructions corresponding to computational subgraphs identified within the program, the computer program being operable to control an apparatus for processing data to perform a method in accordance with the second aspect of the present invention.

Viewed from a fourth aspect, the present invention provides meta processor logic operable to generate look-up table (LUT) configurations for use in configuring a LUT-based unit employed in a data processing apparatus to evaluate one or more output functions associated with a computational subgraph identified within a program, the meta processor logic being operable, for each instruction in a sequence of individual program instructions corresponding to the computational subgraph, to: (a) examine the input operands of that instruction to determine if any input operand corresponds to an output operand of an instruction already processed by the meta processor logic; (b) associate with each input operand that does not correspond to an output operand of an instruction already processed by the meta processor logic one of a plurality of predetermined LUT configurations; (c) associate with each input operand that does correspond to an output operand of an instruction already processed by the meta processor logic the LUT configuration representing the associated instruction output function; and (d) perform a logical operation dependent on the operation specified by the instruction using as inputs the LUT configurations associated with each input operand in order to generate a LUT configuration representing the instruction output function for that instruction.

In accordance with this fourth aspect of the present invention, the meta processor logic can be used to configure any appropriate LUT-based unit employed within the data processing apparatus. Hence, by way of example, the LUT-based unit may be a branch predictor, where the computational subgraph in question is a set of instructions that give rise to the branch condition that needs to be evaluated by the branch predictor. Another example of such a LUT-based unit may be a load/store unit used to calculate a load or store address, where the computational subgraph in question includes a sequence of instructions which affect the load/store address.

BRIEF DESCRIPTION OF THE DRAWINGS

The present invention will be described further, by way of example only, with reference to an embodiment thereof as illustrated in the accompanying drawings, in which.

DESCRIPTION OF AN EMBODIMENT

Figure 1:
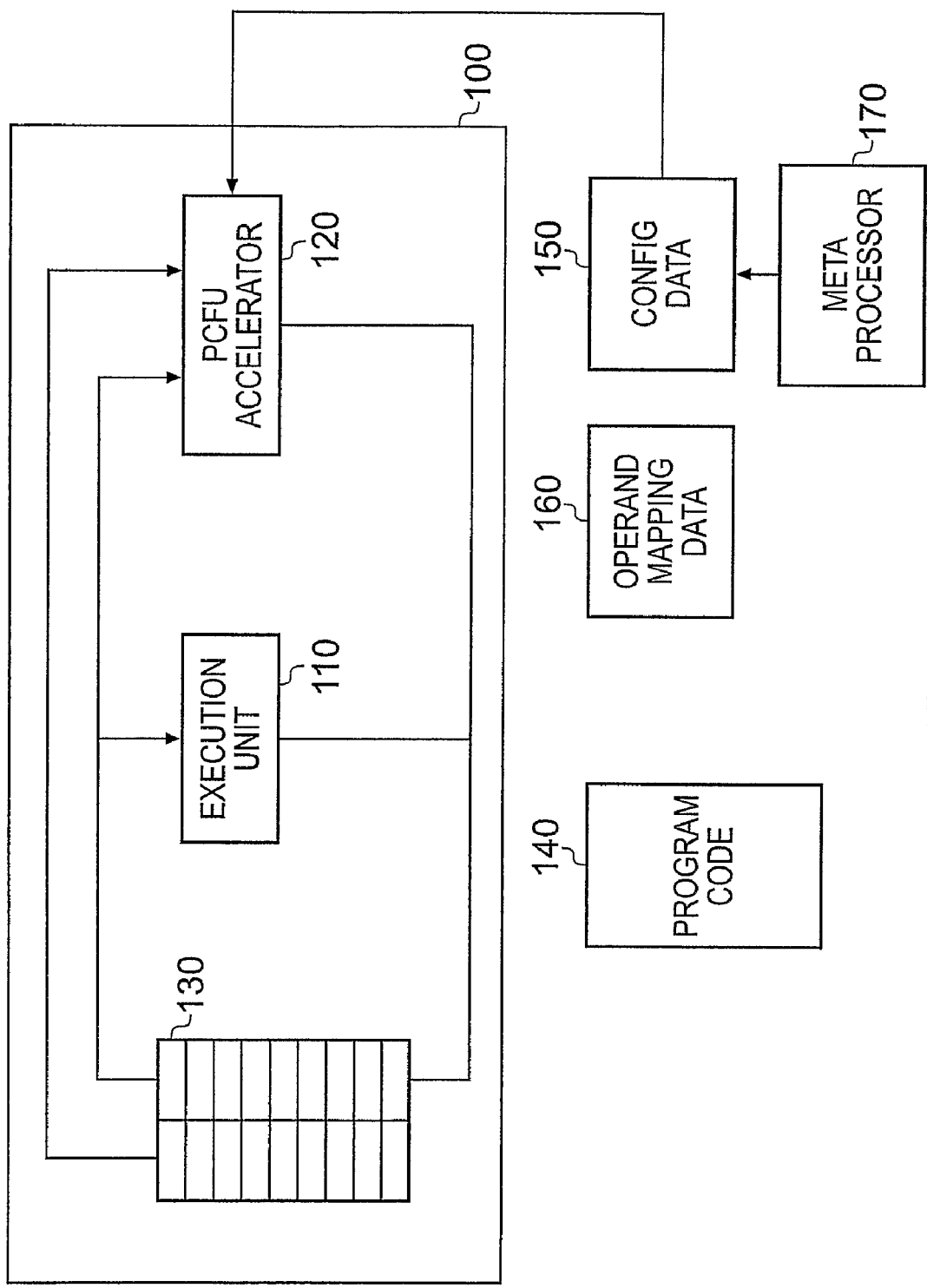
FIG. 1 is a block diagram of a data processing apparatus in accordance with one embodiment of the present invention.

FIG. 1 schematically illustrates an information processor according to an embodiment of the present invention. The system comprises a processor core 100 having an execution unit 110, an accelerator 120 and a register bank 130. The processor core is operable to execute program code 140, a portion of which is executed using the execution unit 110 and another portion of which is executed using the accelerator 120 in dependence upon a set of configuration data 150 and set of operand mapping data 160. The accelerator 120 is connected in parallel to both the execution unit 110 and the register bank 130.

The accelerator 120 takes the form of a Programmable Carry Functional Unit (PCFU) which uses lookup table (LUT) configurations to evaluate output functions associated with computational subgraphs in the program code 140. Each computational subgraph will comprise a sequence of individual program instructions. Instead of those individual program instructions being executed by the execution unit 110, the PCFU accelerator 120 is arranged to handle the computational subgraph by evaluating one or more output functions associated with that computational subgraph, with the evaluation of each output function generating an output operand for storing back to the register bank 130. For each output function to be evaluated, the PCFU accelerator is configured by a LUT configuration provided by the configuration data 150. This same LUT configuration is used for every output bit of the output operand generated for a particular output function.

There are number of ways in which the LUT configurations forming the configuration data 150 can be generated. However, in one embodiment, a meta-processor 170 is provided for determining the LUT configurations through analysis of each of the individual program instructions forming a computational subgraph. More details of the meta-processor 170 will be provided later.

The operand mapping data 160 is used to specify a mapping between input and output operands for the functions evaluated by the PCFU accelerator 120 and locations of operands in the register bank 130, and is used together with the configuration data 150 to define the functions performed by the PCFU accelerator 120.

From the above description, it will be appreciated that whilst the execution unit 110 is operable to individually execute separate instructions of the program code 140, the accelerator 120 is operable to accelerate execution of, for example, certain frequently executed and/or system-critical computational subgraphs representing a portion of the program code 140, by evaluating output functions associated with those computational subgraphs. The configuration data 150 configures the accelerator 120 in a manner that is tuned to the particular computational subgraphs to be executed by it. The program code of the computational subgraphs selected for acceleration is sufficiently self-contained such that the transient variables associated with the computational subgraph do not propagate elsewhere in the program code 140. The execution unit 100 is an ALU execution unit as may typically be found in a RISC data processor, whereas the accelerator 120 is a LUT-based programmable functional unit.

The identification of subgraphs for execution by the PCFU accelerator 120 can be performed in at least two alternative ways. In one embodiment, the subgraphs are identified statically by a compiler during a compilation stage of the program code 140, which involves generation of machine instructions (executable code) from the program code 140. In one particular embodiment, the compiler is arranged to delimit each subgraph by a form of branch instruction to enable the hardware to recognise such subgraphs. These branch instructions can be ignored if the hardware does not support use of an appropriate accelerator to handle the subgraphs.

As an alternative embodiment, the subgraphs may be identified dynamically at runtime by hardware and/or software in the processor core 100. In this particular arrangement, subgraph identification is performed dynamically using information from a retiring instruction stream corresponding to trace data, this data being read by the subgraph identification hardware from a trace cache.

Figure 2:
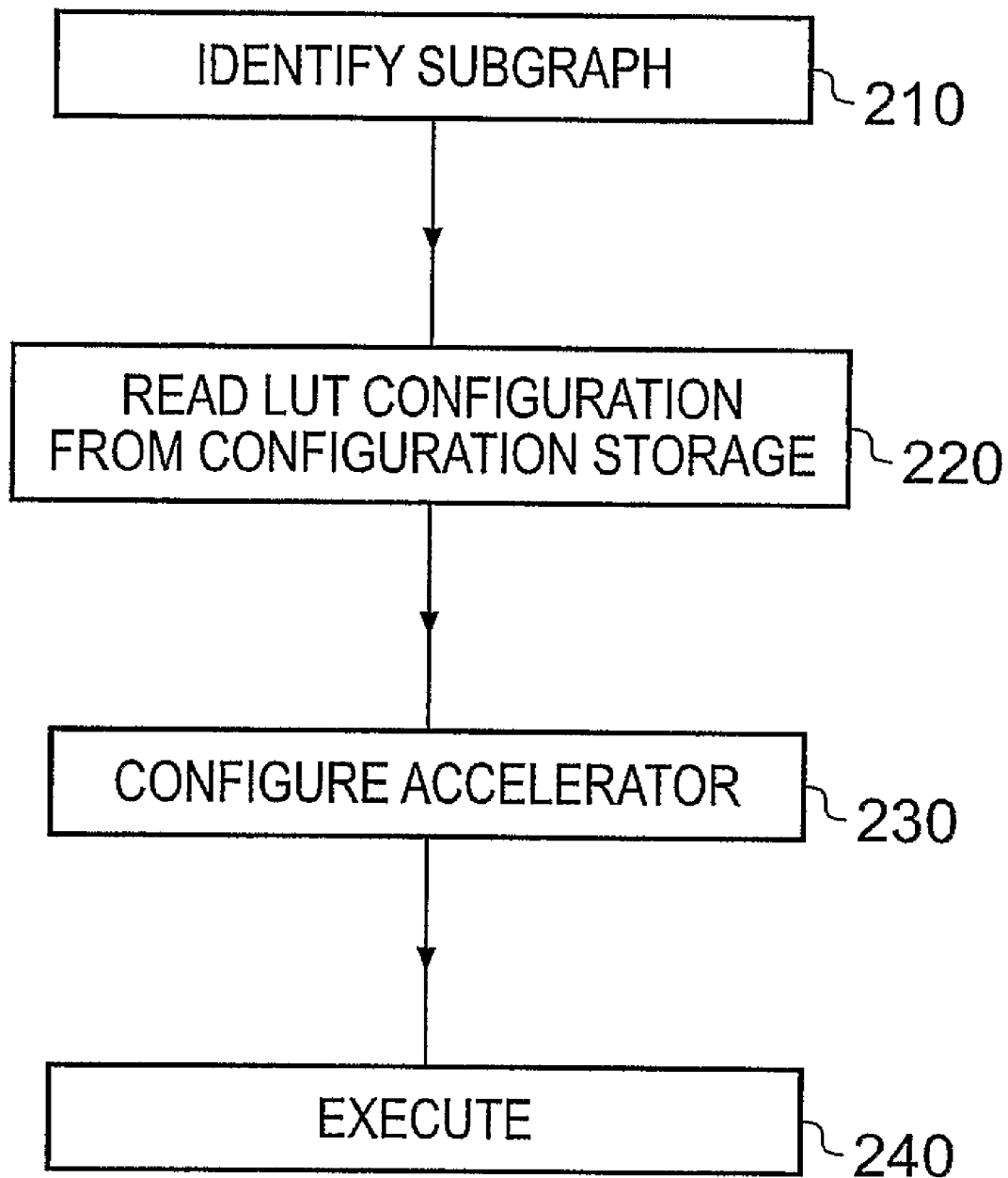
FIG. 2 is a flow diagram illustrating the steps performed in one embodiment in order to execute subgraphs on the accelerator of FIG. 1.

Assuming one of the above two processes has taken place, and hence the subgraphs have been identified, FIG. 2 is a flow chart that schematically illustrates stages involved in dynamic configuration of the accelerator according to one example embodiment. The process begins at stage 210 with identification at run-time of a computational subgraph within the program code 140 and proceeds to stage 220 where the LUT configuration associated with each output function of that identified computational subgraph is read from the configuration storage 150, and subsequently proceeds to stage 230 where the accelerator 120 is configured dependent on the LUT configuration(s). Finally, at stage 240 each output function of the subgraph is evaluated by the accelerator 240.

In one embodiment of the present invention, the meta processor is used to produce LUT configuration data for the PCFU accelerator in an efficient manner, with the PCFU then being configured in accordance with particular LUT configurations to evaluate the required output functions.

Given a sequence of dependent instructions or a dataflow subgraph, the basic idea of the technique of the embodiment of the invention is to extract the logical expression of each output bit as a function of the inputs to the subgraph. Given this logical expression, a lookup table (LUT) stores the truth table corresponding to this expression and is used later to directly compute the output given the inputs.

Figure 3:
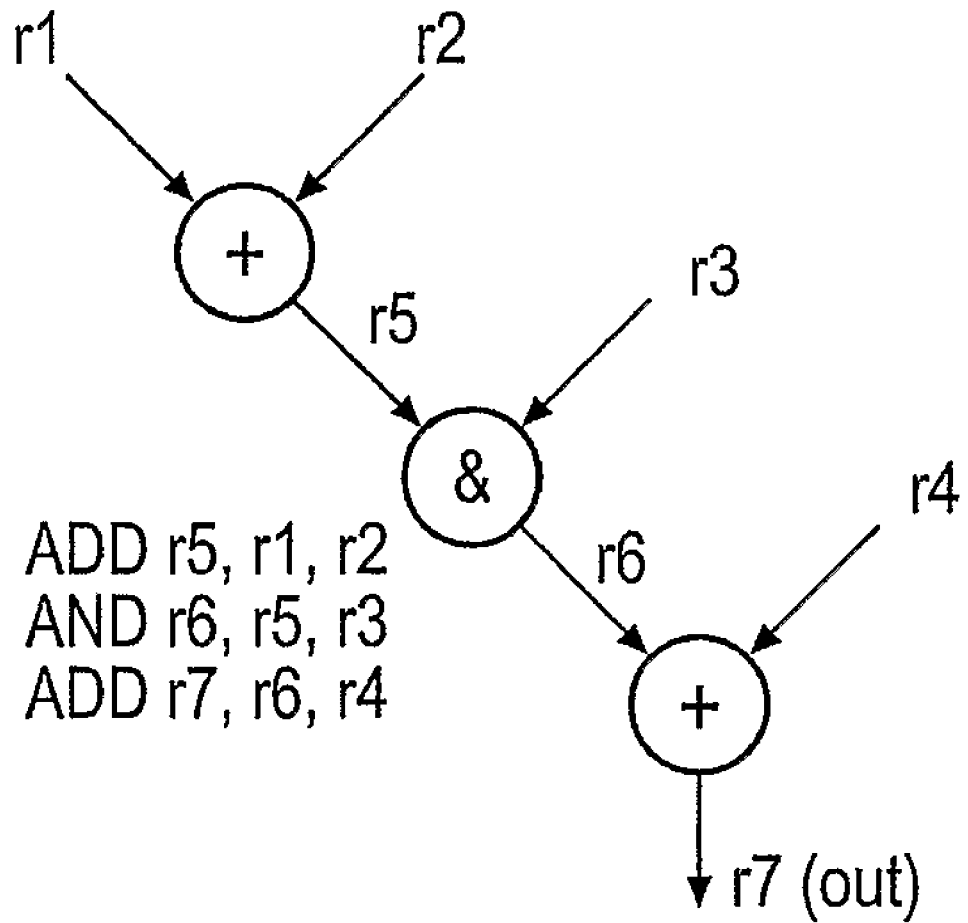
FIG. 3 is a first example of a subgraph that may be executed by the data processing apparatus of one embodiment of the present invention.

Considering the example of FIG. 3, this sequence of three instructions is fully sequential, i.e., no two instructions can execute in parallel. Therefore, such a sequence cannot take benefit from the mechanisms of parallelization available in current micro-architectures. By treating these three instructions as a subgraph, the final output of this subgraph (r7) can be expressed as a logical function of the four inputs (r1 to r4), and this logical function can be efficiently mapped to appropriate LUTs that represent the function. Thus, given 4 inputs, these 3 instructions can be directly executed with a simple table look up.

With this simple principle, a remaining difficulty is how to transform additions and subtractions, or more generally operations that involve carry propagation, to functions that can be mapped to LUTs. This is achieved by also expressing the carries involved in the function as a logical expression and mapping each carry to LUTs that are used to calculate the carry functions.

The example of FIG. 3 involves two additions and one logical operation (AND). The output function for bit i of the output can be expressed as:

$$\begin{aligned} fr7_i &= r6_i \text{ XOR } r4_i \text{ XOR } cin2_{i-1} \quad \left(\begin{array}{c}\text{since this is the definition}\\ \text{of a bitwise add}\end{array}\right) \\ &= \begin{array}{c}(r5_i \text{ AND } r3_i)\\ \text{XOR } r4_i \text{ XOR } cin2_{i-1}\end{array} \quad \text{(removing transient } r6) \\ &= \begin{array}{c}((r1_i \text{ XOR } r2_i \text{ XOR } cin1_{i-1})\\ \text{AND } r3_i)\\ \text{XOR } r4_i \text{ XOR } cin2_{i-1}\end{array} \quad \text{(and removing transient } r5) \end{aligned}$$

where $cin1_i = (r1_i \text{ AND } r2_i) \text{ OR } (r1_i \text{ AND } cin1_{i-1}) \text{ OR } (r2_i \text{ AND } cin1_{i-1})$ and $cin2_i = ((r1_i \text{ XOR } r2_i \text{ XOR } cin1_{i-1}) \text{ AND } r3_i) \text{ AND } r4_i$
$\text{OR } ((r1_i \text{ XOR } r2_i \text{ XOR } cin1_{i-1}) \text{ AND } r3_i) \text{ AND }$
$cin2_{i-1} \text{ OR } r4_i \text{ AND } cin2_{i-1}$ These equations show that any sequence of logical and integer instructions can potentially be expressed as a logical function of the input registers of the subgraph, thus potentially allowing these functions to be mapped directly to LUTs.

The only difficulty of this approach is the fact that every carry bit (and output bit) is a function of the lower significant bit because of carry computation.

In contrast to the LUT-based technique described in the earlier-mentioned S. Yehia and O. Temam article, entitled "From sequences of Dependent Instructions to Functions: An approach for Improving Performance without ILP or Speculation,", the technique of the embodiment of the present invention allows one LUT (and appropriate carry LUTs) to be defined for all output bits. Besides saving on-chip space, this approach also allows use of a fast carry propagation scheme such as in Kogge-Stone or Brent-Kung adders.

Figure 4:
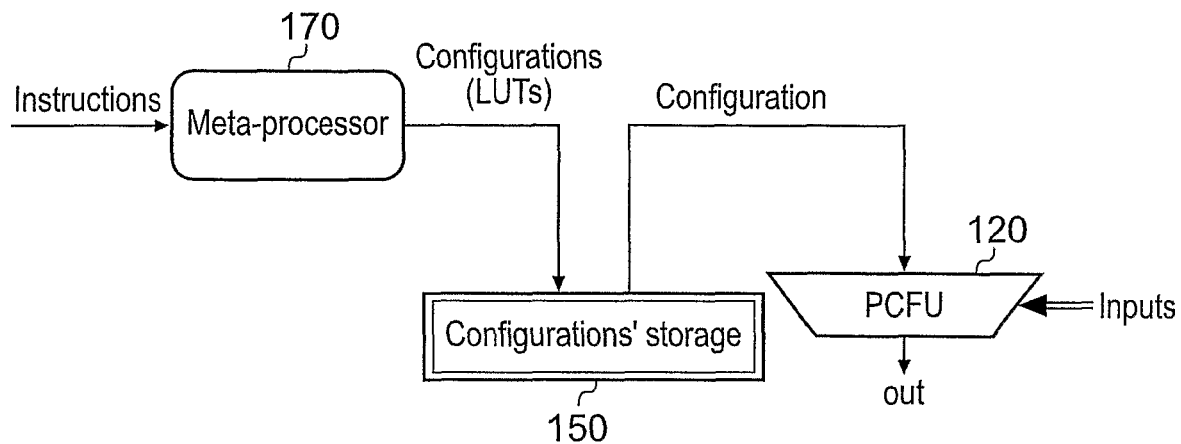
FIG. 4 is a block diagram illustrating a portion of the data processing apparatus of FIG. 1.

FIG. 4 shows a partial view of the system of FIG. 1, FIG. 4 identifying the key parts of the system that facilitate the LUT-based approach described above. The Meta-processor 170 generates and calculates the configurations (LUTs) required to evaluate the output function(s) of each subgraph. The Programmable Carry Functional Unit (PCFU) 120 calculates the output of the function given the inputs and the LUT configurations retrieved from the configurations storage 150. Although the embodiment can assume as many inputs as wanted (at the cost of bigger LUTs) and as many additions/subtractions in the function (at the cost of more carry propagation logic), in one embodiment the system can support up to 4 inputs and 2 additions per subgraph.

The PCFU can collapse sequences of dependent instructions given the LUT of the output function as well as the appropriate LUTs of each generated carry involved in the calculation. The PCFU provides the same function (and hence uses the same LUT) for all the output bits thus allowing a reasonable size of the configuration bits. Also, the PCFU uses high carry propagation networks to generate carries for each addition/subtraction involved in the subgraph, as will be discussed in more detail later.

Figure 5:
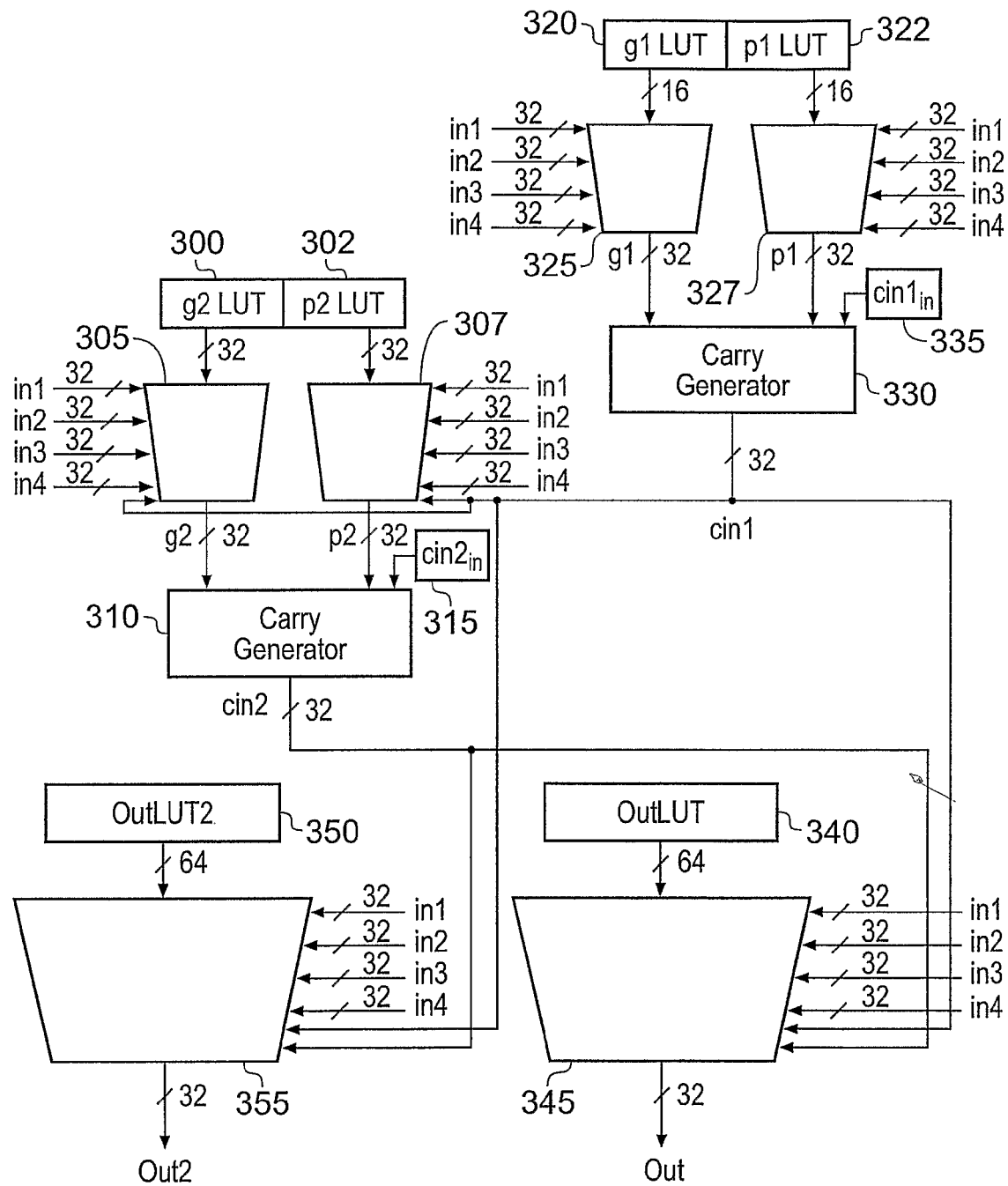
FIG. 5 is a block diagram illustrating one embodiment of the Programmable Carry Functional Unit (PCFU) accelerator of FIG. 1.

FIG. 5 shows a PCFU design that can collapse a sequence of dependent instructions with up to two additions/subtractions and any number of logical operations, given a fixed number of inputs. In particular, the PCFU design of FIG. 5 assumes that there are up to four input operands for the subgraph being evaluated by the PCFU, these operands being referred to in FIG. 5 as in1, in2, in3 and in4. As shown in FIG. 5, an output multiplexer 345 is used for evaluating an output function associated with the subgraph, this multiplexer 345 receiving as an input a LUT configuration 340 referred to as the outLUT. The multiplexer 345 is controlled by the four input operands, and also by the output from two carry generators 310, 330, these carry generators being used to generate carry values associated with the two additions or subtractions supported by the PCFU. Since this means that the multiplexer is controlled by six input bits, then the LUT configuration 340 has to be 64-bits wide. It should be noted that the same 64-bit LUT configuration 340 is used for every output bit of the 32-bit output operand produced by the multiplexer 345 from the six 32-bit control inputs that the multiplexer receives.

As shown in FIG. 5 in greyed-out shade, if a further output function is associated with a computational subgraph, then it is necessary to provide a further multiplexer 355, which is configured by a corresponding 64-bit LUT configuration 350. The multiplexer 355 is controlled by the same inputs as received by the multiplexer 345.

The carry generators 330, 310 receive as inputs a 32-bit generate signal and a 32-bit propagate signal, along with an associated carry-in value 335, 315, respectively. For additions, the carry-in value is set to zero, whilst for subtractions the carry-in value is set to one. For carry generator 330, the generate and propagate inputs are produced by multiplexers 325, 327, respectively, multiplexer 325 receiving as input a generate LUT configuration 320 and multiplexer 327 receiving as input a propagate LUT configuration 322. Similarly, for carry generator 310, the generate and propagate inputs are produced by multiplexers 305, 307, respectively, multiplexer 305 receiving as input a generate LUT configuration 300 and multiplexer 307 receiving as input a propagate LUT configuration 302. The manner in which these generate and propagate LUT configurations are produced will be described later.

The generation of the carry value associated with the first addition or subtraction in the subgraph is managed by the multiplexers 325, 327 and carry generator 330. As shown in FIG. 5, the multiplexers 325, 327 receive as control inputs the four input operands of the computational subgraph, which are used to produce the g1 and p1 outputs based on the g1 LUT 320 and p1 LUT 322 received as inputs. The carry generator 330 then generates a 32-bit carry-in value (cin1) which is routed both to the output multiplexers 345, 355, and also as an input to the multiplexers 305, 307 of the second carry generation unit.

In particular, the second carry generation unit consisting of the multiplexers 305, 307 and carry generator 310 is used to generate a carry-in value (cin2) for the second addition or subtraction supported by the PCFU. The multiplexers 305, 307 receive the four input operands and also the carry-in value produced by the carry generator 330, and based on those control inputs generate a g2 and a p2 output based on the g2LUT 300 and the p2LUT 302 received as inputs. The carry generator 310 then produces the cin2 value based on the g2 and p2 values, and the carry-in bit 315. It should be noted that the g2 and p2 LUTs used by the multiplexer 305 are twice the size of the corresponding LUTs used by the multiplexer 325, due to the extra input (cin1) to the multiplexer 305.

From the above description, it will be appreciated that for each addition/subtraction supported by the PCFU, a carry generation unit consisting of a multiplexer and a carry generator are required. The output function is then evaluated by a single output multiplexer 345 which receives as an input a single LUT configuration 340, and further output functions can be evaluated merely by providing an additional multiplexer and associated single LUT configuration associated with that output function.

Figure 6:
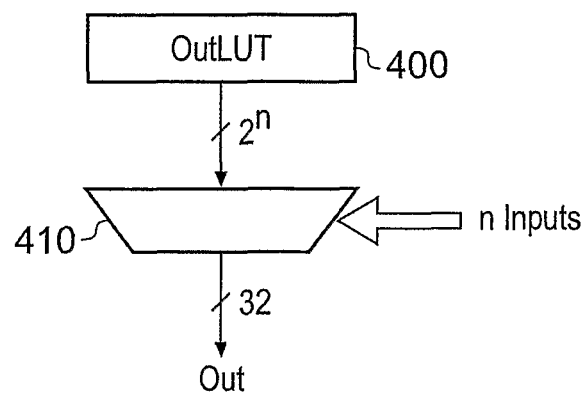
FIG. 6 is a block diagram illustrating a second embodiment of the PCFU accelerator of FIG. 1.

If it was decided to develop a PCFU that would support any number of logical operations within the computational subgraph but no arithmetic instructions such as additions and subtractions, then it would not be necessary to provide any carry generation units, and instead the PCFU design could be implemented using the simple structure illustrated in FIG. 6, this structure being replicated for each output function to be evaluated in association with the computational subgraph. As shown in FIG. 6, a multiplexer 410 is provided which receives the n inputs of the computational subgraph, and based on a single LUT configuration 400 consisting of $2^n$ bits produces a 32-bit output operand.

Note that, although FIG. 5 may suggest that the 2 additions/subtractions need to be dependent, the shown PCFU can collapse any 2 additions/subtractions regardless of their position in the subgraph, i.e., they may be in parallel, dependent or even interleaved with other logical operations.

Use of the PCFU of embodiments of the present invention allows use of more advanced carry generation networks than could be used in prior art accelerators.

Let $a_{n-1}a_{n-2} \ldots a_1a_0$ and $b_{n-1}b_{n-2} \ldots b_1b_0$ be two n-bit binary numbers to add, and let $g_i = a_i$ AND $b_i$(generate) and $p_i = a_i$ XOR $b_i$(propagate)

Most fast carry propagation techniques are based on calculating a $(g_i, p_i)$ pair. R. P. Brent and H. T. Kung in the article entitled "A regular layout for parallel adders," IEEE Trans. on computers, C-31 (March 1982) define the associative operator o where $[G,P] o [G',P'] = [G$ OR $(P$ AND $G'), P$ AND $P']$ So that:

$$[G_{i:j}, P_{i:j}] = \begin{cases} [g_0 \text{ OR } (p_0 \text{ AND } cin_0), p_0] & \text{if } i = j = 0 \\ [g_i, p_i] & \text{if } i = j \\ [G_{i:k}, P_{i:k}] \circ [G_{k-1:j}, P_{k-1:j}] & \text{if } i \neq j \\ & \text{and } (i \geq k \geq j) \end{cases}$$

The final carry is thus calculated as $cout_i = G_{i:0}$

To support subtraction the (gi,pi) is calculated as $g_i = a_i$ AND $(\sim b_i)$(generate) and $p_i = a_i$ XOR $(\sim b_i)$(propagate)

and $cin_0$ is set to 1

In one embodiment the carry generators may use a Brent-Kung structure. However, the carry generators 310, 300 of FIG. 5 in one embodiment use the Kogge-Stone structure described by P. M. Kogge and H. S. Stone in the article "A parallel algorithm for the efficient solution of a general class of recurrence equations," IEEE Trans. on Computers, C-22 (August 1973). Although Kogge-Stone adders use more o operators and are therefore more complex, they do have lower latencies.

In the PCFU of the embodiment illustrated in FIG. 5, for each supported addition/subtraction, a carry generation network is used to generate the appropriate carries for the operation. Note that the approach can use any carry generation scheme according to size and area requirements of the design.

In the proposed design, a (p,g) pair of LUTs are generated for each addition/subtraction encountered, and hence for the example subgraph of FIG. 3:

Generating cin1

$g1_i = r1_i$ AND $r2_i$ $p1_i = r1_i$ XOR $r2_i$ $cin1_{in} = 0$

Generating cin2

$g2_i = ((r1_i \text{ XOR } r2_i \text{ XOR } cin1_{i-1}) \text{ AND } r3_i) \text{ AND } r4_i$ $p2_i = ((r1_i \text{ XOR } r2_i \text{ XOR } cin1_{i-1}) \text{ AND } r3_i) \text{ XOR } r4_i$
$cin2_{in} = 0$ Thus the three instructions of the example of the subgraph of FIG. 3 can be collapsed using 2 LUTs (g1LUT and p1LUT) to generate a first carry, 2 LUTs (g2LUT, p2LUT) to generate a second carry, one output function LUT, and 2 bits for input carries (both set to 0 in this example).

Figure 7:
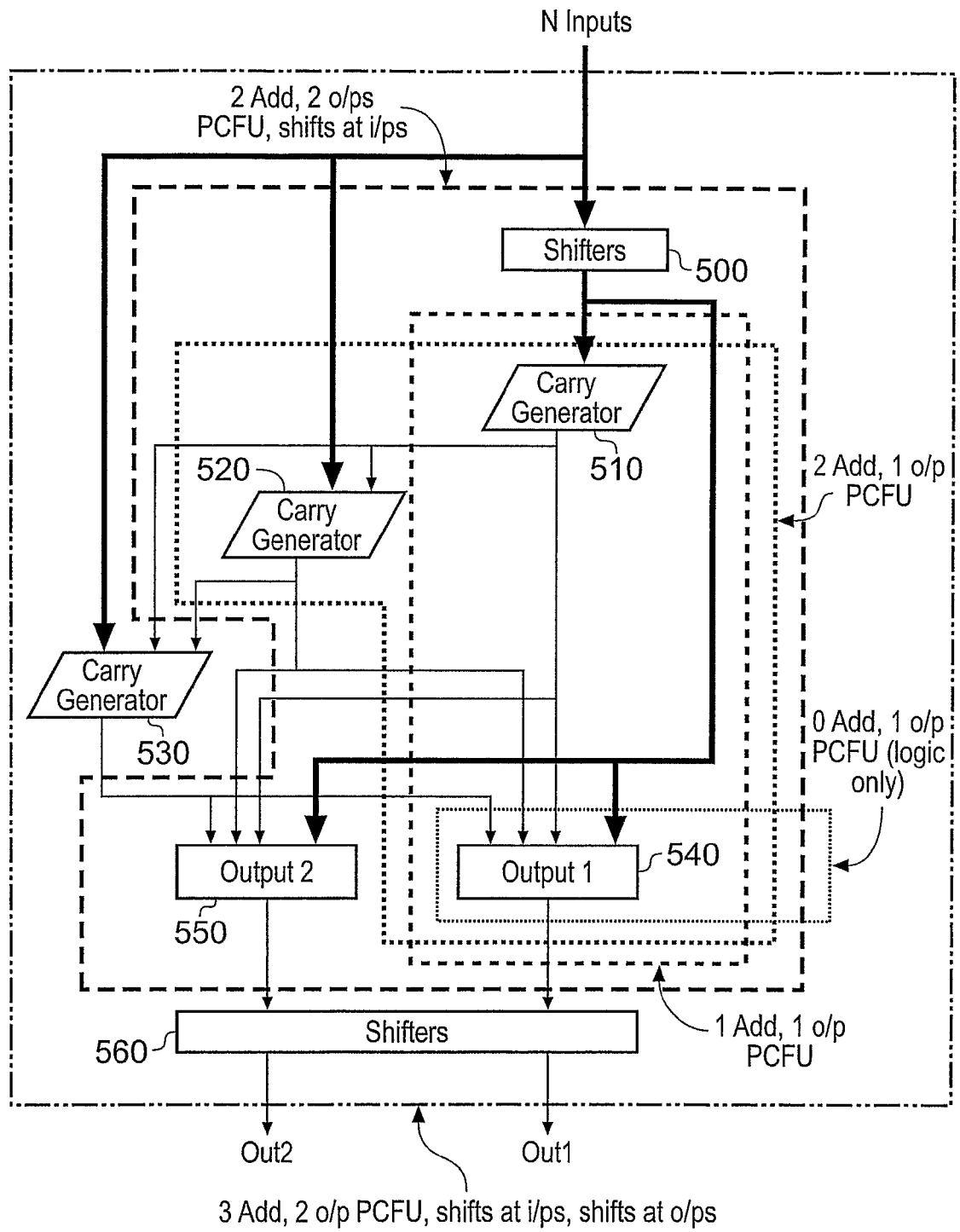
FIG. 7 is a block diagram illustrating a generalised embodiment of the PCFU accelerator of FIG. 1.
Figure 8:
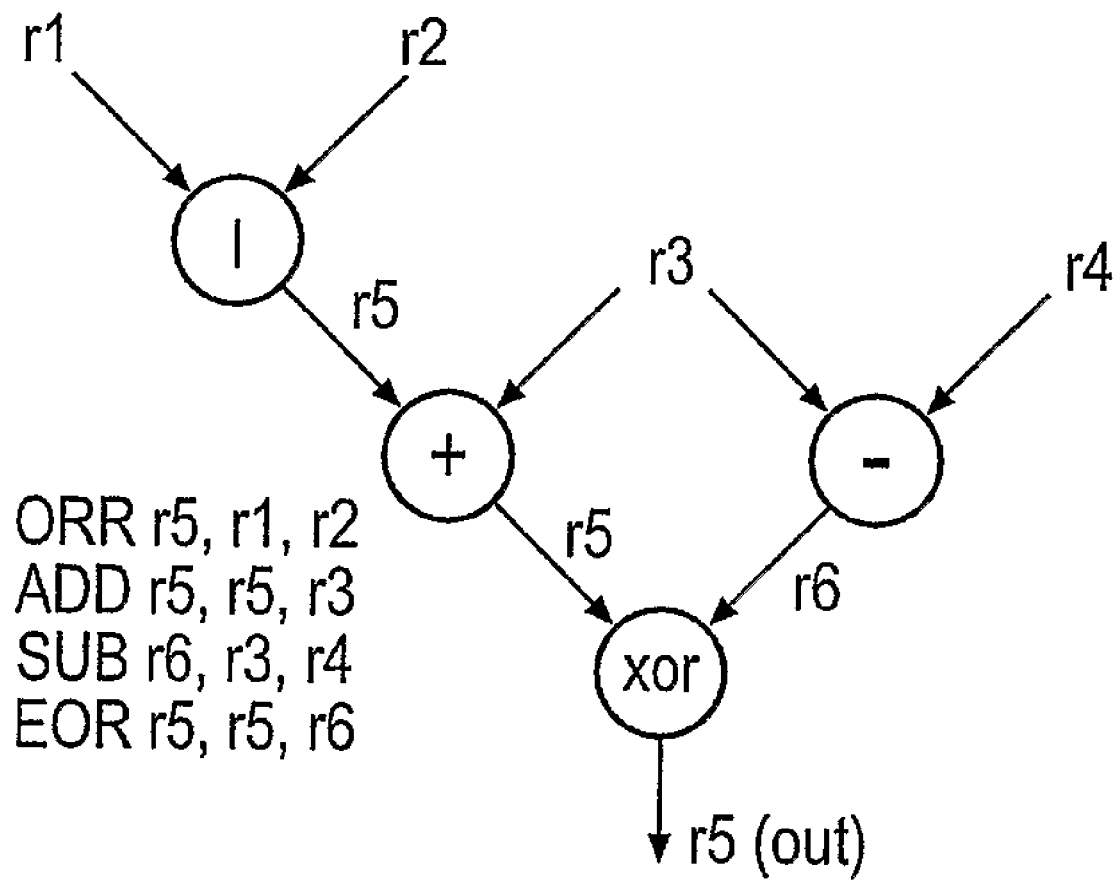
FIG. 8 is a second example of a subgraph that may be executed by the data processing apparatus of one embodiment of the present invention.

FIG. 8 shows another more complex function that can be mapped to the PCFU of FIG. 5. Note that the addition and the subtraction are not dependent and still can be mapped to the PCFU. The configuration of the LUTs is given by:

Out$LUT = ((r1_i \text{ OR } r2_i) \text{ XOR } r3_i \text{ XOR } cin1_{i-1}) \text{ XOR}$
$(r3_i \text{ XOR } (\sim r4_i) \text{ XOR } cin2_{i-1})$ $g1LUT = (r1_i \text{ OR } r2_i) \text{ AND } r3_i, p1LUT = (r1_i \text{ OR } r2_i)$
XOR $r3_i, cin1_0 = 0$ $g2LUT = r3_i \text{ AND } (\sim r4_i) p2LUT = r3_i \text{ XOR } (\sim r4_i)$
$cin2_0 = 1$ FIG. 7 shows basic building blocks of a generalized PCFU that can support N inputs, 3 additions/subtractions, 2 outputs and shift operations at the inputs and outputs of the dataflow subgraph. The basic building blocks of the PCFU are the carry generator 510, 520, 530 for each addition/subtraction supported and an output LUT generator 540, 550 for each subgraph output supported.

Increasing the number of outputs supported by the PCFU is a fairly straight forward process, which only requires adding an output LUT generator in parallel with the already existing output LUT generators. None of the other structures in the PCFU are affected.

Supporting additional inputs is more complicated, since it involves increasing the size of the LUTs for the carry generators and the output LUT generators. This is because the logical function for each bit depends on another boolean variable (the new input), which doubles the size of each truth table used to compute results.

Similar to increasing the number of inputs, increasing the number of adds supported doubles the size of the output LUTs, since the outputs are now a function of another carry-in signal. Beyond this, supporting more adds requires an additional set of carry propagate LUTs, which are dependent on the inputs and all previous carry-in signals. This means that the added carry-propagate LUT is larger than all the previous carry propagate LUTs combined. A new carry generation tree lies directly on the critical path of the PCFU, as well.

Supporting shift operations within subgraphs is desirable, but infeasible on the PCFU. Allowing shifts would make each output bit a function of every input bit, instead of the small number of input bits in the proposed design. This would make the LUTs very large. However, separate shifters 500, 560 may be added at the inputs and/or the outputs of the PCFU to support shift operations at the inputs and outputs of the data-flow subgraphs. This would not change the size of the LUTs, but would lengthen the critical path of the PCFU.

In addition to the PCFU, transparent instruction set customization requires a method for generating control signals for the execution substrate. The PCFU control generator (also called a meta-processor) generates and calculates the functions (i.e. LUT entries for the PCFU).

Figure 9:
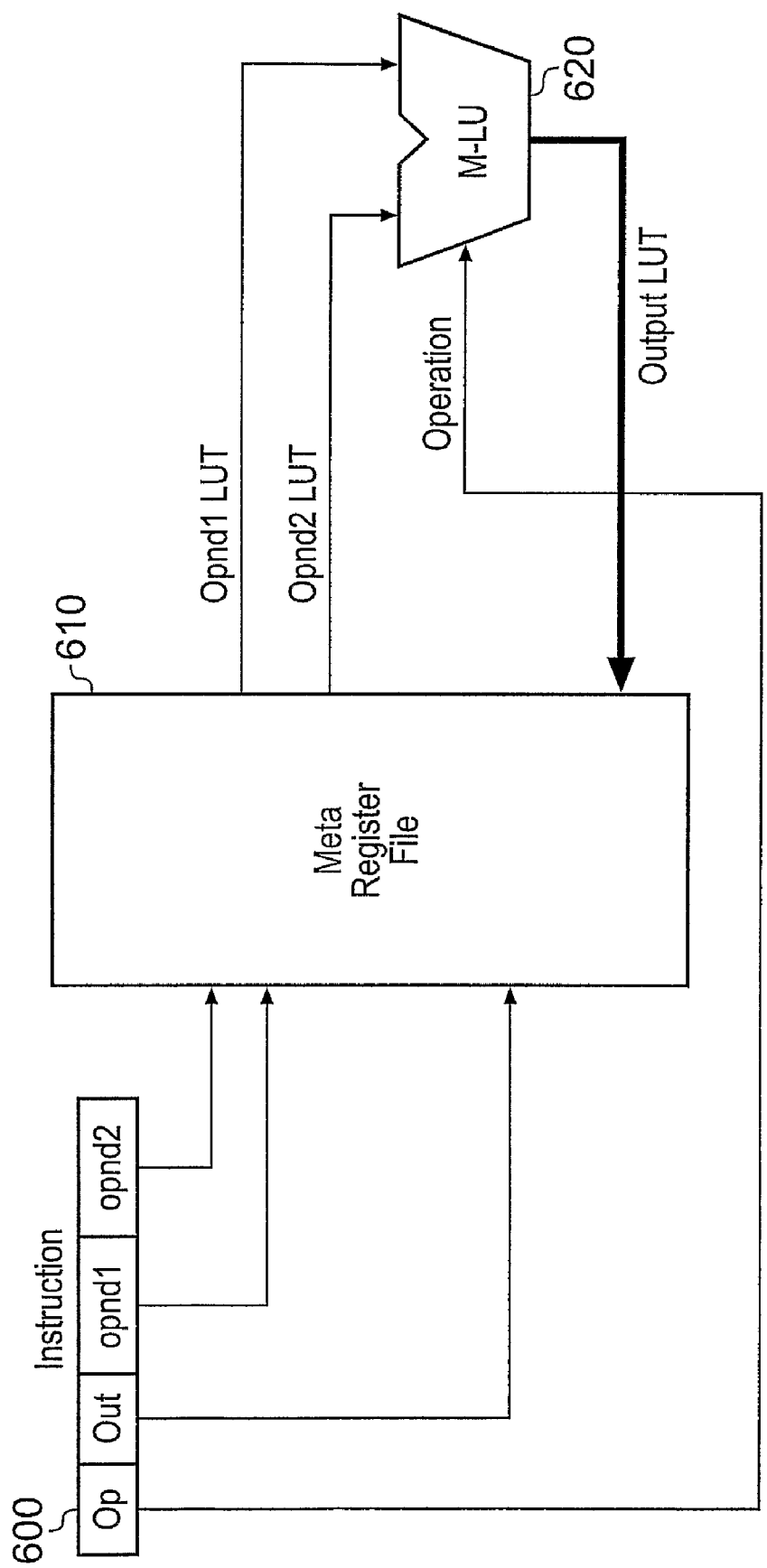
FIG. 9 is a diagram schematically illustrating the operation of the meta-processor of FIG. 1 in accordance with one embodiment.

FIG. 9 shows an abstract view of the LUT generation using a Meta-register file 610 and a Meta-Logical Unit (Meta-LU) 620. The Meta-register file 610 and the Meta-LU 620 pair operates much like the normal register file and the ALU of a basic processor, but calculates the LUT of the output function of the instructions instead of the output of the instruction itself. The basic idea of the LUT configuration generation follows from the observation that a logical expression can be calculated using bitwise operations between input columns of a truth table or output columns of other truth tables (provided the all truth tables have the same inputs, and have the same column positions). Therefore, the meta-LU needs only to perform logical operations and does not need adders or other complex units.

The Meta-register 610 file stores the LUTs of each output operand of the instructions decoded so far. Given a sequence of instructions of a subgraph to map to the PCFU, each instruction is decoded, the LUT associated with each input operand (either a LUT computed for a previously decoded instruction if that operand was output by a previous instruction, or one of a plurality of predetermined LUTs if the input operand has not been encountered previously) is read from the Meta-register file 610, and fed to the Meta-LU 620. The Meta-LU calculates the new output LUT to be associated with the output operand and the resulting LUT is stored back to the Meta-register file in the corresponding output register (given by the output operand of the instruction).

Figure 10:
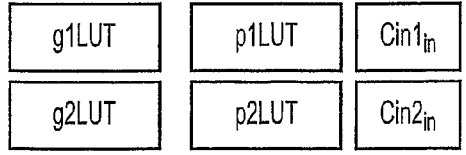
FIG. 10 is a diagram illustrating in more detail the operation of the meta-processor of FIG. 1 in accordance with one embodiment.

FIG. 10 shows an example of the generation of the output LUT of a simple subgraph of 3 instructions. Note that to allow direct generation of LUTs, the size of LUTs are made as big as the maximum number of inputs (including cin1 and cin2—not shown here for simplicity reasons). In the example shown, the LUTs of first and second instructions respectively are 16 bits wide, that is they assume 4-input truth tables (corresponding to r1, r2, r4 and r5) even though the functions are initially two input functions. It should be noted that in reality these LUTs will be 64 bits wide, given the cin1 and cin2 inputs, but for simplicity the two carry inputs are ignored. The truth tables are shown in the figures for clarity, but are not stored in the meta register file. Only the rightmost columns are stored as LUT configurations.

Each entry of the Meta-register file has the following fields:

IsLivein: This field is made true when the register is live-in, i.e. is an input operand of the subgraph (r1, r2, r4 and r5 in the example).

LiveinIdx: Each live-in register is given a unique live-in identifier. This identifier determines also the position of this input in the columns of the truth tables. It is important to note that each live-in input assumes the same column position for all truth tables from which are inferred the LUT configuration.

IsOutput: The field IsOutput is marked true if the register is an output operand of a previously decoded instruction on the subgraph.

FunctionLUT: This field contains the LUT corresponding to this output register. Note that because transient results are not computed in subgraphs, an output register LUT may be overwritten by a more recently generated LUT as LUTs are only functions of live-in registers.

In the example shown in FIG. 10, when the instruction inst1 is decoded, the corresponding IsOutput field is checked to see if a previous instruction has produced an output in r1, and because IsOutput is false, the IsLivein entry is flagged as true and LiveinIdx is given the index "0". As this operand is live-in, the corresponding operand LUT is assigned a predefined LUT corresponding to the rightmost column of a truth table (column in0); similarly the second operand is assigned a LUT corresponding to the second column of the truth table (in1). Note that if a register operand is found to be already marked as live-in, the column given by LiveinIdx is assigned to the operand LUT. The two operands' LUTs are then fed to the Meta-LU. The resulting LUT, which corresponds to the XOR of the two LUT entries (according to the EOR of the instruction), is stored in the output operand (r6) entry in the Meta-register file 610, and the corresponding IsOutput entry is marked as true. Similarly, instruction inst2 is decoded and columns in3 and in4 of the truth tables are ANDed and the resulting LUT is stored in the (r7) entry of the meta-register file 610. Finally, when decoding instruction inst3, because the IsOutput entry of the operands are marked as true, the corresponding LUTs are read from the Meta-register file 610 and sent to the Meta-LU 620 to calculate the LUT of the r12 entry.

Assuming the PCFU can support up to two additions, the Meta-register file needs to store only the LUTs used for the carry generation of the two additions, g1LUT, p1LUT, g2LUT and p2LUT and the input carry bit (set to 0 for addition and 1 for subtraction). The LUTs corresponding to $Cin1_{i-1}$ and $Cin2_{i-1}$ occupy the two leftmost columns of the truth table. When an addition is decoded, the corresponding operand LUTs are read as explained previously. The appropriate carry column (CINLUT) is used according to whether this is the first add/sub or the second one. Given the 2 operands LUTs OP1LUT and OP2LUT, the Meta-LU performs the following operation:

Function LUT=OP1LUT XOR OP2LUT XOR CIN-LUT

GLUT=OP1LUT AND OP2LUT

PLUT=OP1LUT XOR OP2LUT

The FunctionLUT is written in the Meta-register file and the (GLUT,PLUT) are written in (g1LUT,p1LUT) or (g2LUT,p2LUT) depending on whether this is the first addition or the second addition.

If the operation is a subtraction, the OP2LUT is inverted and the corresponding "$cin_0$" is set to 1.

Figure 11:
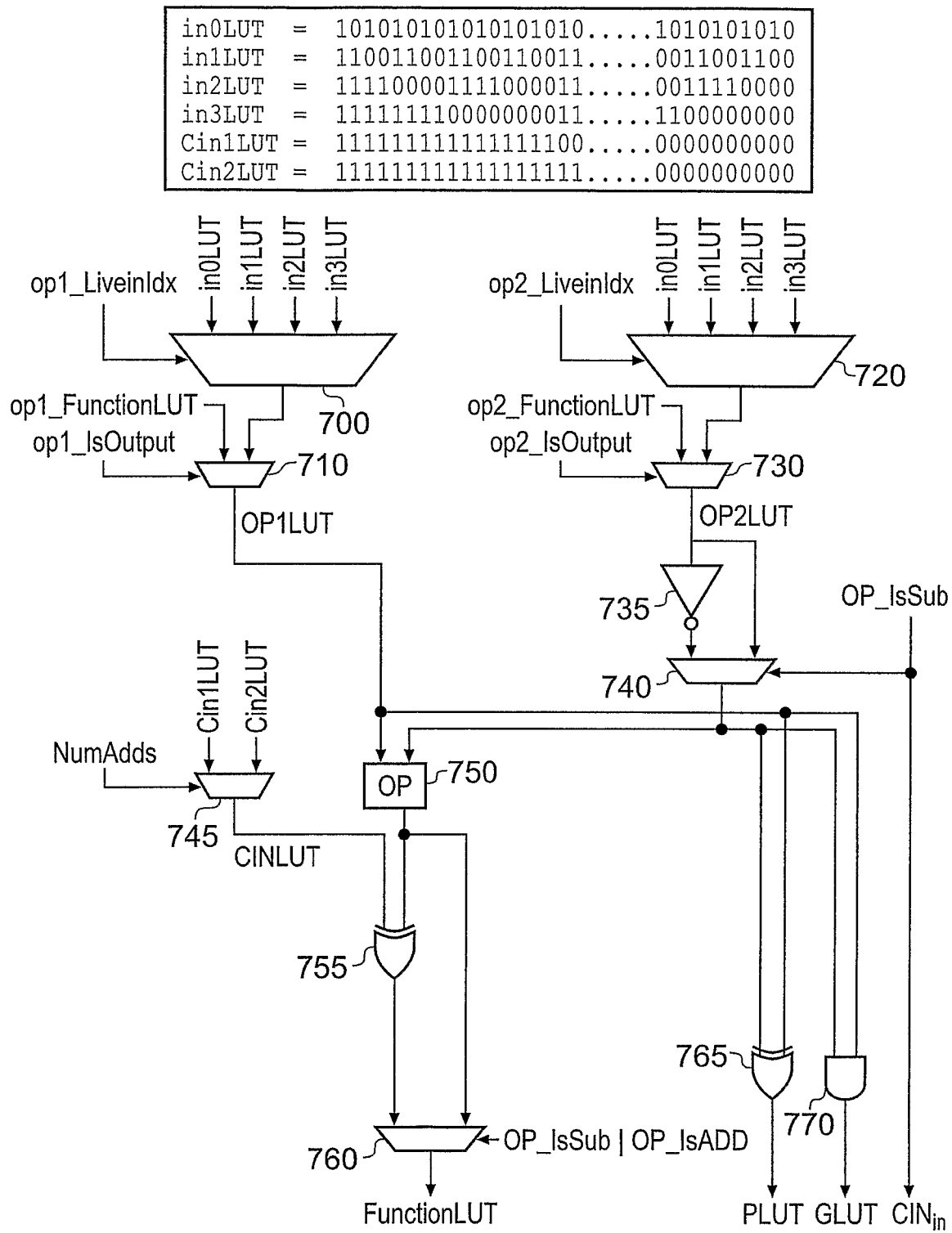
FIG. 11 is a diagram illustrating the construction of the meta-LU of FIG. 9 in accordance with one embodiment of the present invention.

FIG. 11 shows a detailed implementation of the Meta-LU of one embodiment. As discussed earlier, the computational subgraph may have up to four livein input operands, and associated with each of these four livein input operands is a predetermined LUT configuration, these predetermined configurations being identified in FIG. 11 as in0LUT, in1LUT, in2LUT and in3LUT. For each functionLUT generated by the meta-LU, there will be two input operands, referred to as op1 and op2. The multiplexer 700 receives the liveinIdx associated with op1, and based on that input signal selects one of the predetermined LUTs for routing to the multiplexer 710. The multiplexer 710 also receives as a second input the functionLUT value stored in the meta register file 610 for operand 1. As will be appreciated from the earlier description of FIG. 10, if operand 1 does in fact contain a livein value, then the functionLUT value will be irrelevant and may represent a "don't-care" state. Similarly, if the input operand is not a livein value, the functionLUT value will be the value of interest, and the output from the multiplexer 700 is irrelevant, and can take a "don't-care" state. The multiplexer 710 is driven by the IsOutput field of the op1 input within the relevant meta register, and accordingly if IsOutput is set it will output the functionLUT value received as its input, whereas otherwise it will output the value received from the multiplexer 700.

The multiplexers 720, 730 operate in an identical way for the second operand, op2.

The op2LUT output from multiplexer 730 is inverted by inverter 735 with the output from the inverter then being received as a first input of the multiplexer 740. The uninverted version of the op2LUT is also fed as another input to the multiplexer 740. If the operation being evaluated by the meta-LU is a subtraction, then the OP_IsSub value is set, and this will cause setting of the carry in value $CIN_{in}$, and will also cause the multiplexer 740 to output the inverted version of the op2LUT. Conversely, if the operation being evaluated is an addition, then the carry in value will not be set, and the multiplexer 740 will output the normal op2LUT value (i.e. the uninverted value).

The operand unit 750 performs the logical operation required to generate the functionLUT, which may for example be an OR operation, an XOR operation, an AND operation, etc.

If the full operation required is neither an addition nor a subtraction (i.e. the condition "Op_IsSub OR Op_IsAdd" is false), then the output from the logic 750 can be used directly as the functionLUT output, and accordingly multiplexer 760 is arranged to select its right-hand input for output as the functionLUT. However, for additions or subtractions, the output from the logic 750 (which in this example will have performed an XOR operation) also needs to be subject to an XOR operation with an appropriate carry in LUT (CINLUT). In particular, as was shown in FIG. 10, there are two additional LUTs of the truth table, referred to as Cin1LUT and Cin2LUT, which occupy the two left-most columns of the truth table. These two LUTs are received by the multiplexer 745, which is controlled by the number of add/sub instructions that have previously been handled within the subgraph. If the add/sub instruction in question is the first add/sub, then a logic zero control value will be input, which will cause the Cin1LUT value to be output as the CINLUT configuration to the XOR logic 755. Similarly, if the add/sub is the second add/sub instruction in the subgraph, then the NumAdds signal will be set to 1, which will cause the Cin2LUT value to be output as the CINLUT configuration input to the XOR logic 755. The XOR logic 755 will then perform an XOR function based on the CINLUT input and the output from the logic 750, with the result then being routed via the multiplexer 760 as the output functionLUT.

It has been found that the use of the above-described techniques of embodiments of the present invention enables a particularly efficient accelerator to be provided, which can be configured easily, and can execute subgraphs sufficiently quickly to provide sufficient savings with respect to the time that would be taken if the instructions making up those subgraphs were instead routed through the standard execution unit of the processor core. Table 1 below illustrates latency values (in nanoseconds) that were achieved for a variety of configurations of the PCFU design, and in particular for various designs with different numbers of add or subtract instructions supported, different numbers of shifts operations supported, different numbers of inputs and different numbers of outputs:

TABLE 1

| | | | | Latency (ns) |
|---|---|---|---|---|
| 1 | Number of add/sub in PCFU | AS0 | 0 | 0.59 |
| 2 | | AS02OUT | | 0.62 |
| 3 | | AS1 | 1 | 2.15 |
| 4 | | AS1EM1 | | 2.28 |
| 5 | | AS1EM2 | | 2.31 |
| 6 | | AS12OUT | | 2.44 |
| 7 | BASELINE=> | AS2 | 2 | 3.79 |
| 8 | | AS2EM1 | | 4.27 |
| 9 | | AS2EM2 | | 3.77 |
| 10 | | AS3 | 3 | 5.82 |
| 11 | | AS3EM1 | | 6.4 |
| 12 | | AS3EM2 | | 5.82 |
| 13 | | AS3EM3 | | 6.1 |
| 14 | | AS3EM4 | | 5.75 |
| 15 | | AS3EM5 | | 7.39 |
| 16 | | AS3EM6 | | 7.52 |
| 17 | | AS3EM7 | | 6.5 |
| 18 | | AS32OUT | | 5.78 |
| 19 | Shifts | INSH | Live ins only | 5.02 |
| 20 | | INSH2OUT | | 5.22 |
| 21 | | OUTSH | Output only | 4.45 |
| 22 | | OUTSH2OUT | | 5.15 |
| 23 | Shift operand (assuming inputs) | BAR | Any (Barrel Shifter) | 5.02 |
| 24 | | C1 | Constant (1) | 4.42 |
| 25 | | C12OUT | | 4.78 |
| 26 | | C2 | Constant (2) | 4.56 |
| 27 | | C22OUT | | 4.64 |
| 28 | | C16 | Constant (16) | 4.39 |
| 29 | | C162OUT | | 4.67 |
| 30 | | C1216 | Constants (1, 2, 16) | 4.8 |
| 31 | | C12162OUT | | 4.86 |
| 32 | Number of inputs | 2IN | 2 | 3.03 |
| 33 | | 2IN2OUT | | 2.66 |
| 34 | | 3IN | 3 | 3.24 |
| 35 | | 3IN2OUT | | 3.32 |
| 36 | | 4IN | 4 | 3.79 |
| | | 4IN2OUT | | 4.2 |
| 37 | | 5IN | 5 | 5.25 |
| 38 | | 5IN2OUT | | 5.3 |
| 39 | | 5IN3OUT | | 5.4 |
| 40 | | 6IN | 6 | 5.47 |
| 41 | | 6IN2OUT | | 5.27 |
| 42 | | 6IN3OUT | | 5.87 |
| 43 | Number of Outputs | 1OUT | 1 | 3.79 |
| 44 | | 2OUT | 2 | 4.2 |
| 45 | | 3OUT | 3 | 4.57 |

The designs which produced the results in Table 1 were synthesised using Synopsys tools with a standard cell library in 013μ.

The embodiment of the invention described herein can be used to address the issues of chains of dependent instructions that have little or no Instruction Level Parallelism (ILP). In particular, in one embodiment, a specialized configurable functional unit (the PCFU accelerator) is used to collapse those chains of dependent instructions and execute them more efficiently, thus avoiding overhead of bypass networks, decoding of multiple instructions and unnecessary transient result storage in the processor.

The embodiment of the invention described herein provides an innovative configurable LUT-based device—the Programmable Carry Functional Unit (PCFU)—that outperforms known devices that collapse sequences of dependent instructions in term of area and time, and also provides a very efficient method (using the proposed Meta-Processor) to generate configurations for that device. The simple interconnect of the PCFU allows for reduced latency, and reduced hardware cost.

The PCFU of embodiments of the present invention can execute subgraphs of any number of logical operations and a predefined number of additions/subtractions. The PCFU offers the advantage of being sufficiently programmable to cover a wide variety of subgraphs while maintaining a relative low interconnect complexity and latency compared to FPGA devices.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus for processing data under control of a program having program instructions including sequences of individual program instructions corresponding to computational subgraphs identified within said program, each computational subgraph having a number of input operands and producing one or more output operands, said apparatus comprising:
   an operand store operable to store the input and output operands;
   processing logic operable to execute individual program instructions from said program;
   configurable accelerator logic operable, in response to reaching an execution point within said program corresponding to a sequence of individual program instructions corresponding to a computational subgraph, to evaluate one or more output functions associated with said computational subgraph, the evaluation of each output function generating an output operand for storing in the operand store, and each output operand corresponding to an output that would have been generated had the sequence of individual program instructions corresponding to the computational subgraph have been executed by the processing logic;
   configuration storage operable to store a single look-up table (LUT) configuration for each output function;
   for each output function to be evaluated, the accelerator logic being configured dependent on the associated single LUT configuration from the configuration storage such that on receipt of the input operands of the computational subgraph, the accelerator logic will generate the output operand;
   wherein the sequence of individual program instructions corresponding to the computational subgraph consist of logical instructions requiring only bitwise level operations on the input operands of the instructions, and further comprise one or more arithmetic instructions requiring carry propagation operations;
   the configuration storage comprises, for each arithmetic instruction, a set of carry determination LUT configurations;
   the accelerator logic comprises, for each arithmetic instruction, carry generation logic configured by the associated set of carry determination LUT configurations to generate a carry operand from the input operands of the computational subgraph; and
   for each output function, the associated single LUT configuration consists of $2^{n+m}$ bits, where n is less than or equal to the number of input operands of the computational subgraph and where m is the number of arithmetic instructions within the sequence of individual program instructions corresponding to the computational subgraph.

2. Apparatus as claimed in claim 1, wherein each set of carry determination LUT configurations comprises a generate LUT configuration and a propagate LUT configuration, the generate LUT configuration defining a logical AND operation performed using at least two portions of the subgraph as inputs and the propagate LUT configuration defining a logical XOR operation performed using at least two portions of the subgraph as inputs.

3. Apparatus as claimed in claim 1, wherein the one or more arithmetic instructions comprise add or subtract instructions, and each carry generation logic within the accelerator logic is further configured by a control bit identifying whether the associated arithmetic instruction is an add instruction or a subtract instruction.

4. Apparatus as claimed in claim 1, further comprising:
   meta processor logic operable to generate the single look-up table (LUT) configuration for each output function, the meta processor logic being operable to generate, for each instruction in the sequence of individual program instructions corresponding to the computational subgraph, a LUT configuration representing the instruction output function;
   wherein the meta processor logic is further operable to generate, for each arithmetic instruction, the set of carry determination LUT configurations.

5. Apparatus as claimed in claim 4, wherein the meta processor logic is operable, for each instruction in the sequence of individual program instructions corresponding to the computational subgraph, to:
   (a) examine the input operands of that instruction to determine if any input operand corresponds to an output operand of an instruction already processed by the meta processor logic;
   (b) associate with each input operand that does not correspond to an output operand of an instruction already processed by the meta processor logic one of a plurality of predetermined LUT configurations;
   (c) associate with each input operand that does correspond to an output operand of an instruction already processed by the meta processor logic the LUT configuration representing the associated instruction output function; and
   (d) perform a logical operation dependent on the operation specified by the instruction using as inputs the LUT configurations associated with each input operand in order to generate a LUT configuration representing the instruction output function for that instruction;
   wherein:
   each instruction may specify one or more registers, each register being specified as either an input register for an input operand of that instruction or an output register for an output operand of that instruction;

the meta processor logic comprises a meta register file having at least a meta register for each output register specified by the sequence of individual program instructions corresponding to the computational subgraph, each meta register being used to identify the LUT configuration associated with the associated output operand; and the meta processor logic further comprising a meta logic unit operable to perform, with reference to appropriate meta registers of the meta register file, the logical operation dependent on the operation specified by each instruction;

wherein the meta register file contains additional registers operable to store each set of carry determination LUT configurations.

6. A method of processing data under control of a program having program instructions including sequences of individual program instructions corresponding to computational subgraphs identified within said program, each computational subgraph having a number of input operands and producing one or more output operands, said method comprising the steps of:

executing individual program instructions from said program with processing logic;

in response to reaching an execution point within said program corresponding to a sequence of individual program instructions corresponding to a computational subgraph, evaluating within configurable accelerator logic one or more output functions associated with said computational subgraph, the evaluation of each output function generating an output operand, and each output operand corresponding to an output that would have been generated had the sequence of individual program instructions corresponding to the computational subgraph have been executed by the processing logic;

storing a single look-up table (LUT) configuration for each output function;

for each output function to be evaluated, configuring the accelerator logic dependent on the associated single LUT configuration such that on receipt of the input operands of the computational subgraph, the accelerator logic will generate the output operand;

wherein the sequence of individual program instructions corresponding to the computational subgraph consist of logical instructions requiring only bitwise level operations on the input operands of the instructions, and further comprise one or more arithmetic instructions requiring carry propagation operations;

storing, for each arithmetic instruction, a set of carry determination LUT configurations;

for each arithmetic instruction, using the associated set of carry determination LUT configurations to generate a carry operand from the input operands of the computational subgraph;

for each output function, the associated single LUT configuration consists of $2^{n+m}$ bits, where n is less than or eciual to the number of input operands of the computational subgraph and where m is the number of arithmetic instructions within the sequence of individual program instructions corresponding to the computational subgraph.

7. A computer program stored on a computer readable medium having program instructions including sequences of individual program instructions corresponding to computational subgraphs identified within said program, said computer program being operable to control an apparatus for processing data to perform a method as claimed in claim 6.

* * * * *